(12) United States Patent
Ishihara et al.

(10) Patent No.: US 10,982,966 B2
(45) Date of Patent: *Apr. 20, 2021

(54) GENERATION OF ROUTE NETWORK DATA FOR MOVEMENT

(71) Applicant: INTERNATIONAL BUSINESS MACHINES CORPORATION, Armonk, NY (US)

(72) Inventors: Tatsuya Ishihara, Tokyo (JP); Masayuki Murata, Tokyo (JP); Daisuke Sato, Chiba-ken (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/777,004

(22) Filed: Jan. 30, 2020

(65) Prior Publication Data

US 2020/0166355 A1    May 28, 2020

Related U.S. Application Data

(63) Continuation of application No. 15/295,463, filed on Oct. 17, 2016, now Pat. No. 10,605,614.

(51) Int. Cl.
*G01C 21/00* (2006.01)
*G01C 21/34* (2006.01)
(Continued)

(52) U.S. Cl.
CPC ....... *G01C 21/3461* (2013.01); *G01C 21/206* (2013.01); *G01C 21/3407* (2013.01); *G06T 17/00* (2013.01)

(58) Field of Classification Search
None
See application file for complete search history.

(56) References Cited

U.S. PATENT DOCUMENTS

| | | | |
|---|---|---|---|
| 6,542,811 B2* | 4/2003 | Doi ........................ | G01C 21/20 |
| | | | 701/429 |
| 8,441,356 B1* | 5/2013 | Tedesco ................. | G08B 21/02 |
| | | | 340/573.1 |

(Continued)

OTHER PUBLICATIONS

Elias—"Pedestrian Navigation—Creating a tailored geodatabase for routing"—Published: Positioning, Navigation and Communication. Mar. 2007 pp. 41-47.

(Continued)

*Primary Examiner* — Jonathan M Dager
(74) *Attorney, Agent, or Firm* — Tutunjian & Bitetto, P.C.; Randall Bluestone

(57) ABSTRACT

A method for generating route network data for movement includes calculating a movable area in a place for a target type of movement using a space model of the place and an object model for the target type. The method also includes building network structure for route network data of the place using the movable area for the target type, in which the network structure includes a plurality of nodes and a plurality of links representing routes within the place. The method further includes updating the network structure by shifting a node to orient a link connected to the node toward any one of predetermined directions under a condition relating to an initial position of the node.

18 Claims, 10 Drawing Sheets

(51) Int. Cl.
*G01C 21/20* (2006.01)
*G06T 17/00* (2006.01)

(56) References Cited

U.S. PATENT DOCUMENTS

| | | | | |
|---|---|---|---|---|
| 8,494,507 | B1* | 7/2013 | Tedesco | G09B 21/001 |
| | | | | 455/418 |
| 8,538,688 | B2 | 9/2013 | Prehofer | |
| 8,949,021 | B2* | 2/2015 | Witmer | G06F 16/29 |
| | | | | 701/409 |
| 9,146,112 | B2* | 9/2015 | Friedlander | G01C 21/20 |
| 9,322,657 | B2* | 4/2016 | Friedlander | G01C 21/3492 |
| 9,632,671 | B2* | 4/2017 | Albright | H04M 1/72572 |
| 9,651,385 | B2* | 5/2017 | Nair | G01C 21/206 |
| 9,829,322 | B2* | 11/2017 | Lee | G01C 21/34 |
| 9,909,880 | B2* | 3/2018 | Carter | G01C 21/34 |
| 9,972,216 | B2* | 5/2018 | Chen | G09B 21/006 |
| 9,996,730 | B2* | 6/2018 | Lee | G06F 1/163 |
| 10,024,680 | B2* | 7/2018 | Lee | G01C 21/3652 |
| 10,132,641 | B2* | 11/2018 | Carter | G01C 21/3484 |
| 10,172,760 | B2* | 1/2019 | Hendrix | H04W 4/33 |
| 10,231,895 | B2* | 3/2019 | Girardini | H04W 4/025 |
| 10,248,856 | B2* | 4/2019 | Moore | G06K 9/00671 |
| 2004/0199325 | A1* | 10/2004 | Kishigami | G01C 21/3641 |
| | | | | 701/417 |
| 2004/0203349 | A1* | 10/2004 | Detweiler | H04W 4/00 |
| | | | | 455/41.1 |
| 2005/0099291 | A1* | 5/2005 | Landau | A61H 3/061 |
| | | | | 340/539.13 |
| 2005/0134800 | A1* | 6/2005 | Kim | H04N 9/68 |
| | | | | 351/242 |
| 2006/0108426 | A1* | 5/2006 | Hopkins | A61H 3/061 |
| | | | | 235/462.45 |
| 2006/0129308 | A1* | 6/2006 | Kates | A61H 3/066 |
| | | | | 701/532 |
| 2006/0146719 | A1* | 7/2006 | Sobek | G01C 21/20 |
| | | | | 370/238 |
| 2008/0280265 | A1* | 11/2008 | Lopez-Jaime | G09B 21/003 |
| | | | | 434/112 |
| 2010/0125409 | A1* | 5/2010 | Prehofer | G01C 21/3484 |
| | | | | 701/408 |
| 2010/0179755 | A1* | 7/2010 | Kohno | G01C 21/32 |
| | | | | 701/532 |
| 2011/0153193 | A1* | 6/2011 | Fox | G01C 21/20 |
| | | | | 701/533 |
| 2011/0153208 | A1* | 6/2011 | Kruglick | G01C 21/32 |
| | | | | 701/533 |
| 2011/0172907 | A1* | 7/2011 | Rui Da Silva Freitas | |
| | | | | G09B 5/125 |
| | | | | 701/533 |
| 2011/0173067 | A1* | 7/2011 | Herbst | G01C 21/3638 |
| | | | | 705/14.49 |
| 2011/0238291 | A1* | 9/2011 | Bach | A61H 3/04 |
| | | | | 701/533 |
| 2011/0270654 | A1* | 11/2011 | Banerjee | G06Q 10/047 |
| | | | | 705/14.4 |
| 2011/0307172 | A1* | 12/2011 | Jadhav | G01S 19/14 |
| | | | | 701/491 |
| 2012/0046821 | A1* | 2/2012 | Pettersson | G01C 21/20 |
| | | | | 701/25 |
| 2012/0063779 | A1* | 3/2012 | Zhang | H04J 14/0257 |
| | | | | 398/50 |
| 2013/0030680 | A1* | 1/2013 | Friedlander | E01C 23/01 |
| | | | | 701/117 |
| 2013/0085671 | A1* | 4/2013 | Friedlander | G01C 21/3484 |
| | | | | 701/527 |
| 2013/0093852 | A1* | 4/2013 | Ye | A61H 3/068 |
| | | | | 348/46 |
| 2014/0125671 | A1* | 5/2014 | Vorobyov | G06K 9/00637 |
| | | | | 345/427 |
| 2014/0181673 | A1* | 6/2014 | Work | G09B 21/008 |
| | | | | 715/729 |
| 2015/0324646 | A1* | 11/2015 | Kimia | G06F 3/005 |
| | | | | 348/62 |
| 2016/0084952 | A1* | 3/2016 | Karlapalem | A61H 23/02 |
| | | | | 342/118 |
| 2017/0295457 | A1* | 10/2017 | Mappus, IV | A61H 3/066 |
| 2019/0026673 | A1* | 1/2019 | Balchin | H04W 4/80 |

OTHER PUBLICATIONS

Serna, et al. "Urban accessibility diagnosis from mobile laser scanning data" ISPRS Journal of Photogrammetry and Remote Sensing—vol. 84. Apr. 2013.pp. 23-32.

Wilkie et al.—"Transforming GIS Data into Functional Road Models for Large-Scale Traffic Simulation" IEEE Transactions on Visualization and Computer Geraphics, vol. 18, No. 6. pp. 890-901. Jun. 2012.

List of IBM Patents or Patent Applications Treated as Related dated Jan. 30, 2020, 2 pages.

* cited by examiner

GENERATION OF ROUTE NETWORK DATA FOR MOVEMENT

BACKGROUND

Technical Field

The present invention, generally, relates to methods for generating route network data used for movement, more particularly, to generating route network data for movement using available space information of a place.

Related Art

Due to recent advances in indoor and outdoor positioning systems, seamless navigation across indoor and outdoor environments is expected. Notwithstanding, route network data used for navigation has not been well developed due to cost concerns.

The Ministry of Land, Infrastructure, Transport and Tourism (MLIT), which is a ministry of the Japanese government, has defined a so-called "pedestrian space network" as one of route network data formats. The pedestrian space network data represents network topology of routes for pedestrian navigation, which may include a plurality of nodes, a plurality of links and accessibility information such as width, a level difference, the number of steps, slope, existence of textured paving, etc.

An example of using the pedestrian space network includes developing accessible navigation applications for all people. However, since the pedestrian space network may require large development costs, a small amount of the pedestrian space network data in limited places may be provided so far, which may include merely public spaces and facilities of a limited part of municipalities.

Meanwhile, three dimensional (3D) modeling technologies, such as BIM (Building Information Modeling) and CIM (Construction Information Modeling), have become popular in order to manage lifecycle of structures, such as buildings and road structures. In addition, 3D laser scanners enable the creation of 3D models of existing buildings by capturing as-built conditions of the buildings. However, such 3D modeling data may not be sufficiently utilized for purposes other than lifecycle management of the structures.

SUMMARY

According to an embodiment of the present invention, a computer-implemented method for generating route network data for movement is provided. The method includes calculating a movable area in a place for a target type of movement using a space model of the place and an object model for the target type, building network structure for route network data of the place using the movable area for the target type, in which the network structure includes a plurality of nodes and a plurality of links representing routes within the place, and updating the network structure by shifting a node so as to orient a link connected to the node toward any one of predetermined directions under a condition relating to an initial position of the node.

Computer systems and computer program products relating to one or more aspects of the present invention are also described and claimed herein.

Additional features and advantages are realized through the systems/methods of the present invention. Other embodiments and aspects of the invention are described in detail herein and are considered a part of the claimed invention.

BRIEF DESCRIPTION OF THE DRAWINGS

The subject matter, which is regarded as the invention, is particularly pointed out and distinctly claimed in the claims at the conclusion of the specification. The forgoing and other features and advantages of the invention are apparent from the following detailed description taken in conjunction with the accompanying drawings in which:

DETAILED DESCRIPTION

Now, the present invention will be described using particular embodiments, and the embodiments described hereafter are understood to be only referred as examples and are not intended to limit the scope of the present invention.

One or more embodiments according to the present invention are directed to computer-implemented methods, computer systems and computer program products for generating route network data for movement using a space model of a place and an object model for a target type of movement.

Hereinafter, referring to the series of FIGS. 1-6, a computer system and method for generating route network data for movement according to an exemplary embodiment of the present invention is described. Then, referring to the series of FIGS. 1 and 7-9, a computer system and method for generating route network data for movement according to an alternative embodiment of the present invention is described. Finally, referring to FIG. 10, a hardware configuration of a computer system according to one or more embodiments of the present invention is described.

EXEMPLARY EMBODIMENT

Now, referring to the series of FIGS. 1-6, a route network generation system and computer-implemented method for generating route network data for movement, which can be used to provide accessible navigation, using a three dimensional (3D) space model of a target place and a 3D object model for a target type of movement according to an exemplary embodiment of the present invention is described.

Figure 1:
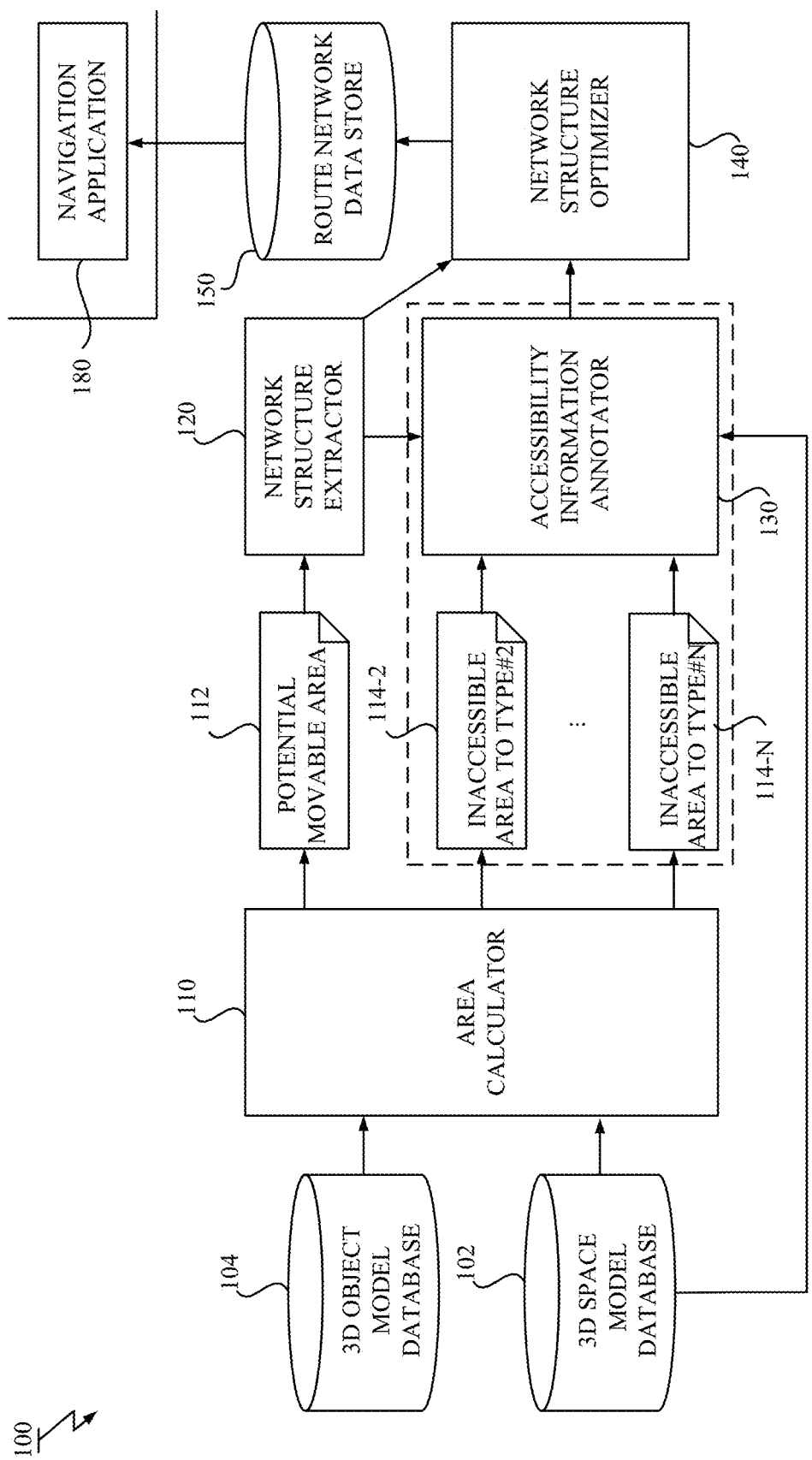
FIG. 1 illustrates a block/flow diagram of a route network generation system according to an embodiment of the present invention.

FIG. 1 illustrates a block/flow diagram of a route network generation system 100 according to an exemplary embodiment of the present invention. As shown in FIG. 1, the route network generation system 100 may include a 3D space model database 102, a 3D object model database 104, an area calculator 110, a network structure extractor 120, a network structure optimizer 140, and a route network data store 150.

The 3D space model database 102 may be a database that stores space models of various places. The space model stored in the 3D space model database 102 may be in a form of 3D modeling data, which represents physical structure at a certain place using a collection of points connected by triangles, lines, etc. in 3D space. The 3D space model may be provided as a 3D digital model data that is a part of BIM (Building Information Modeling) or CIM (Construction Information Modeling), or 3D scanned data that is acquired by a 3D laser scanner. The place represented by the 3D space model may be any one of indoor and outdoor architectural spaces, which may include premises in a station, a floor of a building, a room in a home, road, plaza, park, to name but a few.

The 3D object model database 104 may be a database that stores object models for various types of movement. The object model stored in the 3D object model database 104 may be in a form of 3D modeling data, which represents a person with or without a device, which corresponds to respective type of the movement, using a collection of points connected by triangles, lines, etc. in 3D space. For example, the object model for a type of wheelchair users may have a shape imitating a person riding in a wheelchair. The object model may also have physical information including a size, a ground contact area and the like, and ability information relating to movement, which may include stair-mounting ability, slope-climbing ability and the like.

The types of movement may include, but not limited to, walking (e.g., without any devices or aids), walking with a stick, walking with two sticks or crutches, walking with a frame, walking with a white cane, walking with an assistance dog, walking with a guide, moving by a manual wheelchair, moving by an electric wheelchair, walking with small children, walking with a trolley bag, and walking with a buggy, etc. The 3D object model database 104 may store appropriate 3D object model with the physical and ability information for each type of the movement. Note that the aforementioned types of the movement are examples. Some types may be rearranged to one generalized type. Some type may be divided into a plurality of subdivided types.

In a particular embodiment, by using given 3D space and object models in the databases 102, 104, the area calculator 110, the network structure extractor 120 and the network structure optimizer 140 may be configured to cooperate together in order to generate route network data with optimized network structure, as a minimal configuration.

In a particular embodiment with the minimal configuration, a 3D space model of a target place may be given in advance and one or more target types of the movement may be designated by a user from among the given types of the movement. For example, if a user wants a route network data for manual wheelchair users, merely the type "moving by a manual wheelchair" is designated as the target type of the movement. For example, if the user wants a route network data for pedestrians including manual wheelchair users, the type "walking" and the type "moving by a manual wheelchair" are designated as the target types of the movement.

The area calculator 110 may be configured to calculate a potential movable area 112 for the target type of the movement using the 3D space model of the target place and the 3D object model for the target type. Calculating by using these models includes any form of utilization of the models, which may include calculating the potential movable area 112 based at least in part on these models, and calculating the potential movable area 112 based at least in part on information that is directly or indirectly based at least in part of these models. The potential movable area 112 may represent an area where people are able to pass through by means of any one of the target types of movement. In the describing embodiment, the potential movable area 112 is calculated as a two dimensional (2D) image for simplicity. However, in other embodiments, the potential movable area 112 can be calculated as a 3D data such as 3D image, which includes voxels instead of pixels.

In a particular embodiment, the area calculator 110 may be configured to simulate movement of the 3D object model for the target type in the 3D space model of the target place to calculate a movable area for the target type. The simulation may be performed under a constraint on a size, a ground contact area, stair-mounting ability and/or slope climbing ability relating to the target type, which can be retrieved from the 3D object model database 104.

For example, using a walking stick may require greater width than that required for a person who does not use any devices or aids. A person using a white cane or with an assistance dog, or wheelchair user needs greater width. Also the electric wheelchairs may have more slope-climbing ability than the manual wheelchairs. The simulation can be performed by taking such difference between the types into account.

When one type of the movement is designated by the user, the movable area calculated for the one type can be simply used as the potential movable area 112. For example, if the user wants the route network data for the manual wheelchair users, a movable area for the type "moving by a manual wheelchair" may be calculated as the potential movable area 112 by using the 3D object that imitates a person riding in the wheelchair.

When two or more types of movement are designated by the user, a union area of two or more movable areas for the two or more types may be calculated as the potential movable area 112. The union area may represent an area movable for at least one of the two or more designated types. For example, if the user wants route network data for the pedestrians including the manual wheelchair users, movable areas for the types "walking" and "moving by a manual wheelchair" may be calculated by using a 3D object that imitates a walking person and a 3D object that imitates a person riding in a wheelchair, respectively. Then, a union area of the movable areas for these types may be calculated as the potential movable area 112.

The network structure extractor 120 may extract network structure from the calculated potential movable area 112. The network structure extractor 120 may be configured to build the network structure for the route network data of the target place using the calculated potential movable area 112. Building by using the potential movable area 112 includes any form of utilization of the potential movable area 112, which may include building the network structure based at least in part on the potential movable area 112, and building the network structure based at least in part on information that is directly or indirectly based at least in part of the potential movable area 112. The network structure build by the network structure extractor 120 may include a plurality of nodes and a plurality of links, each of which is connected between respective pair of neighbor nodes. The links may represent routes within the target place.

In a particular embodiment, the network structure extractor 120 may first generate a skeleton of the potential movable area 112 by image processing, then detect corners from the skeleton as nodes and finally connect the nodes by links to construct a graph as the network structure for the route network data.

The network structure optimizer 140 may optimize the network structure initially obtained by the network structure extractor 120 so that a shape of the network structure becomes appropriate for accessible navigation. The network structure optimizer 140 may be configured to update the network structure by shifting a node so as to orient a link connected to the node toward any one of predetermined directions. The shifting of the node may be performed under a condition relating to an initial position of the node.

The predetermined direction to which the link is oriented may be defined by an angle of the link with respect to other link connected to same node. The predetermined directions may include at least one selected from a group including a direction straight to other link connected to the node, a direction perpendicular to the other link, a direction having an angle of 45 degrees to the other link, and directions each having an angle corresponding to 1, 2, 4, 5, 7, 8, 10 or 11 o'clock with respect to the other link by using analogy of a twelve-hour clock.

In a particular embodiment, the network structure optimizer 140 may update the network structure using an evaluation function, which expresses features of a preferable shape of the network structure, under the condition relating to the initial position of the node.

The network structure that is appropriate for accessible navigation can have the following features:
  (a) minimal links in order to provide simple navigation;
  (b) corner or junctions in perpendicular or straight shape (or have a simple angle such as 45 degrees, 30 degrees (1 o'clock), etc.) in order to provide intuitive navigation; and
  (c) links that are along with a wall and/or a landmark for cue of locomotion in order to provide safe navigation.

To obtain such a preferably-shaped network structure for accessible navigation, the evaluation function may include a term that evaluates deviation of orientation of the link from the predetermined directions. Also, the condition may constrain the node so that the position of the node after being updated is within a predetermined range from the initial position, which may reflect optimal distance along with the wall and/or landmark for cue of locomotion.

The network structure optimizer 140 can optimize the network structure by minimizing the evaluation function under the condition so as to obtain a shape that approximates the preferable-shape with the aforementioned feature (a)-(c). In the describing embodiment, the evaluation function is a loss function in which case it is to be minimized. However, in another embodiment, the evaluation function may be a reward function in which case it is to be maximized.

The route network data store 150 may be configured to store the route network data with the network structure that is optimized by the network structure optimizer 140. In a particular embodiment, the route network data may be a pedestrian space network data that includes a plurality of nodes each having position information and a plurality of links each having accessibility information.

Further referring to FIG. 1, a block/flow diagram of a route network generation system 100 according to one or more embodiments is also illustrated by using a dashed rectangular. As shown in FIG. 1, the route network generation system 100 may further include an accessibility information annotator 130.

In some embodiments, by using the given 3D space and object models stored in the databases 102 and 104, the area calculator 110, the network structure extractor 120, the accessibility information annotator 130 and the network structure optimizer 140 may be configured to cooperate together in order to generate route network data with annotated accessibility information, as extended configurations.

In an embodiment, two or more target types of the movement may be designated by the user. For example, if the user wants a route network data for pedestrians with accessibility information, the type "walking" and the type "moving by a manual wheelchair" may be specified as the target types of the movement.

In some embodiments, the area calculator 110 may be configured to obtain an inaccessible area 114 (e.g., 114-2, ..., 114-N) for a certain type in addition to the potential movable area 112. The inaccessible area 114 for the certain type can be calculated by subtracting a movable area for the certain type from the potential movable area 112 that may be a union area for the two or more target types. For example, an inaccessible area to the manual wheelchair users can be calculated by subtracting a movable area for the type "moving by a manual wheelchair" from the potential movable area 112. Instead of subtracting from the union area, simply a movable area 112 for a base type of movement (e.g., "walking") can be used as minuend if the movable area 112 for the base type is expected to cover all of movable areas for other types.

In a particular embodiment, the area calculator 110 may be configured to obtain each inaccessible area 114 (e.g., 114-2, ..., 114-N) for each certain type (e.g., type #2, ..., type #N). Calculation of an inaccessible area 114 for the base type of the movement (e.g., "walking") may be omitted if it is not necessary.

For example, an inaccessible area 114 to the wheelchair user and an inaccessible area to a person who is pushing a buggy may be calculated when the types "walking", "moving by a manual wheelchair" and "walking with a buggy" are designated by the user.

In some embodiments, the accessibility information annotator 130 may be configured to find a link corresponding to the inaccessible area 114 from among the links in the network structure that may be extracted by the network structure extractor 120. The accessibility information annotator 130 may be further configured to annotate accessibility information to the found link.

The accessibility information can be obtained by overlaying each found link on the 3D space model of the target place and by referring each location corresponding to each found link in the 3D space model. The accessibility information includes at least one selected from a group including a type of a route corresponding to the link (e.g., walkway, pedestrian path, moving walkway, etc.), the width of the route, the slope of the route, a level difference in the route, the number of steps in the route, existence of a textured paving in the route, existence of a handrail in the route and a surface type of the route (e.g., soil, gravel, pavement, etc.), which can be retrieved from the 3D space model database 102.

In a particular embodiment, the accessibility information annotator 130 may be configured to find a link by using each inaccessible area 114 for each of the two or more types or by using an union area of the inaccessible areas 114 for the two or more types.

With respect to the network structure optimizer 140, the network structure optimizer 140 may optimize the network structure that is annotated by the accessibility information annotator 130. Alternatively, the network structure optimizer 140 may optimize the network structure that is initially obtained by the network structure extractor 120. Order of annotation and optimization may not be limited, and in later case the accessibility information annotator 130 can receive the network structure that is optimized by the network structure optimizer 140.

In an embodiment, the accessibility information obtained by the accessibility information annotator 130 may not be utilized for the optimization. However, in another embodiment, the network structure optimizer 140 can optimize the network structure by using a condition on the accessibility information. In another embodiment, the accessibility information annotation and the optimization may be iterated alternatively.

With respect to the route network data store 150, the route network data store 150 may store the route network data with the network structure that is optimized by the network structure optimizer 140 and is annotated by the accessibility information annotator 130.

FIG. 1 also shows a navigation application 180 as one application that can use the route network data stored in the route network data store 150. By using the route network data generated in the route network generation system 100, the navigation application 180 can provide accessible navigation for all people.

In particular embodiments, each of modules 102, 104, 110, 120, 130, 140, 150 and 180 described in FIG. 1 may be implemented as, but not limited to, a software module including program instructions and/or data structures in conjunction with hardware components such as a processor, a memory, etc.; a hardware module including electronic circuitry; or a combination thereof. These modules 102, 104, 110, 120, 130, 140 and 150 for generating the route network data for movement may be implemented on a single computer device, such as a personal computer and a server machine, or over a plurality of devices, such as a computer cluster of the computer devices in a distributed manner.

Hereinafter, referring to FIGS. 2-6, a novel process for generating the route network data using the 3D space model of the target place and the 3D object model for the type of the movement is described.

Figure 2:
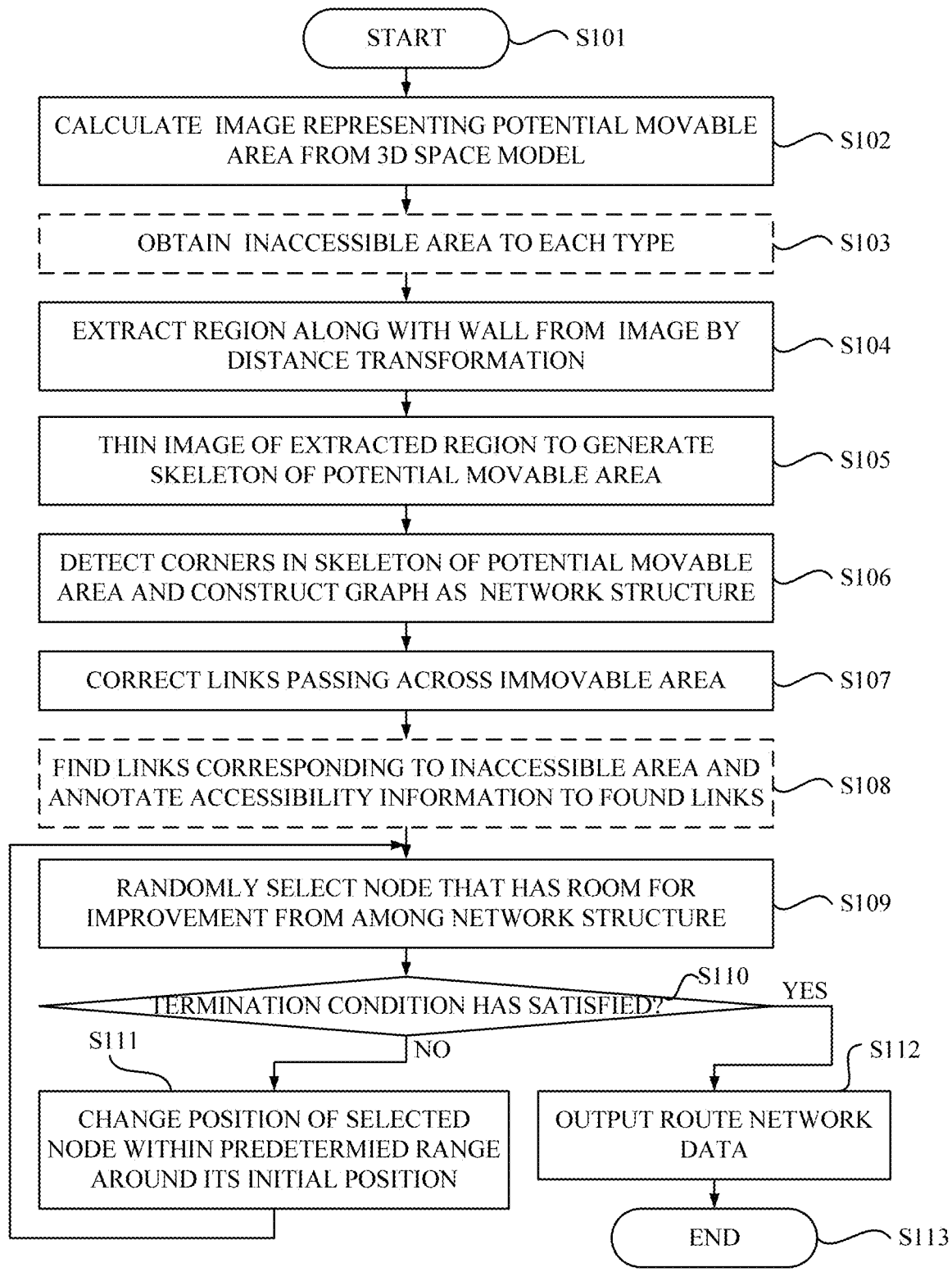
FIG. 2 is a flowchart depicting a process for generating route network data for movement in the route network generation system according to an embodiment of the present invention.

FIG. 2 shows a flowchart depicting a process for generating the route network data in the route network generation system 100 shown in FIG. 1. Note that the process shown in FIG. 2 may be performed by a processing unit that implements the area calculator 110, the network structure extractor 120, the accessibility information annotator 130 and the network structure optimizer 140 shown in FIG. 1.

Figure 3A:
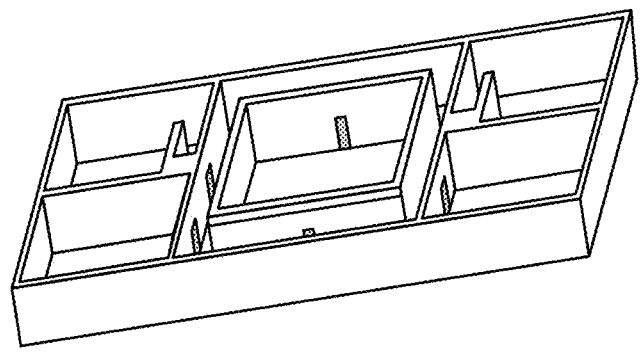
FIG. 3A is a perspective view of an example of an input 3D space model according to an embodiment of the present invention.

The process shown in FIG. 2 may begin at step S101 in response to receiving a request for generating route network data with one or more arguments. The arguments may specify the target type(s) of the movement, and the target place or the 3D space model of the target place. The arguments may also specify necessity of the accessibility information annotation. The user can designate the target space by name or identifier of the place or designate the 3D space model of the target space by a filename. FIG. 3A shows schematically an example of an input 3D space model of a target place.

Figure 3B:
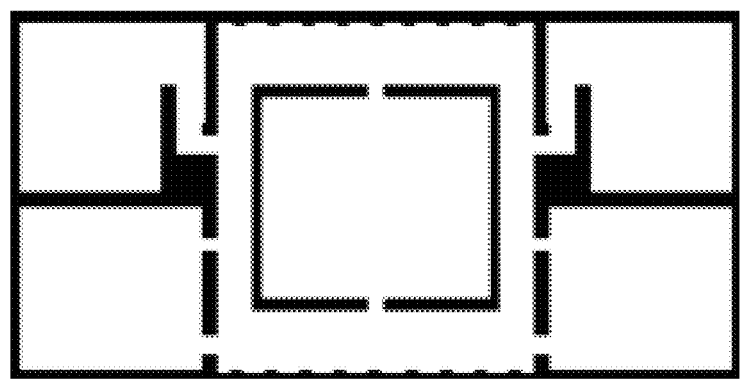
FIG. 3B is an image of a potential movable area according to an embodiment of the present invention.

At step S102, the processing unit may calculate an image representing the potential movable area 112 from the given 3D space model of the target place. FIG. 3B shows an example of the image of the potential movable area 112.

At step S103, the processing unit may optionally obtain the inaccessible area 114 for each target type using the given 3D space model of the target place. The processing at the step S102 may be performed if two or more target types are designated and the accessibility information annotation is requested.

Figure 3C:
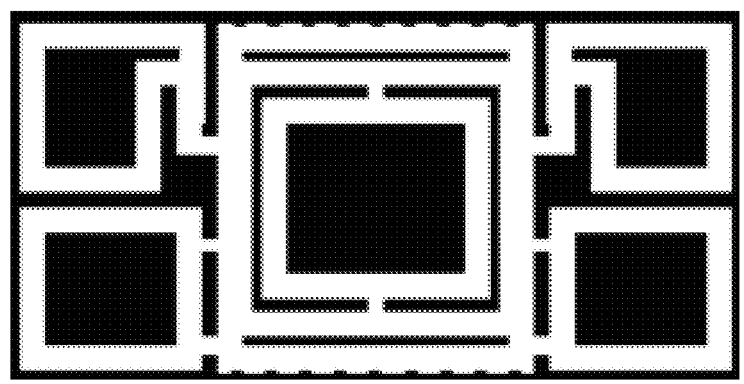
FIG. 3C is an image of an extracted region along with walls according to an embodiment of the present invention.

At step S104, the processing unit may extract a region along with a wall in the target place from the image of the potential movable area 112 by using distance transformation. FIG. 3C shows an example of an image of the region extracted from the image of the potential movable area 112 shown in FIG. 3B.

Figure 4A:
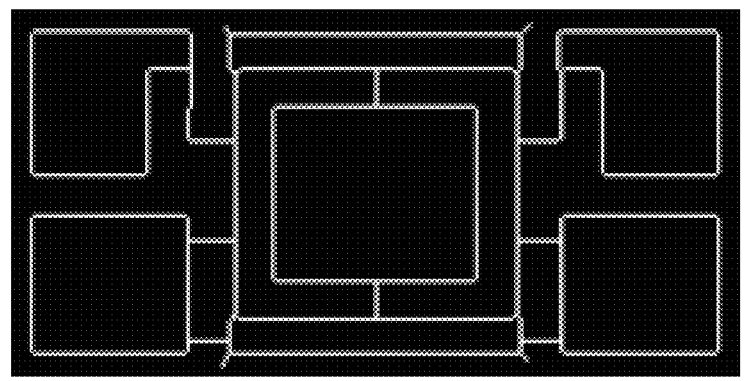
FIG. 4A depicts an example of a skeleton of the potential movable area according to an embodiment of the present invention.

At step S105, the processing unit may perform image processing such as thinning on the image of the extracted region to generate a skeleton of the potential movable area 112 such as a line drawing. FIG. 4A shows an example of the skeleton of the potential movable area 112 thinned from the image shown in FIG. 3C.

Figure 4B:
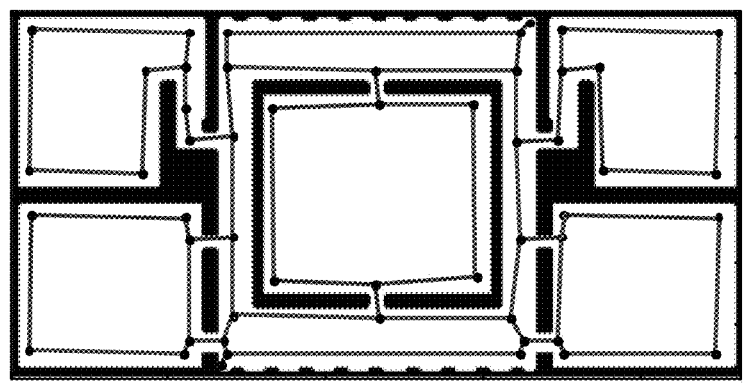
FIG. 4B depicts an example of initial network structure according to an embodiment of the present invention.
Figure 4C:
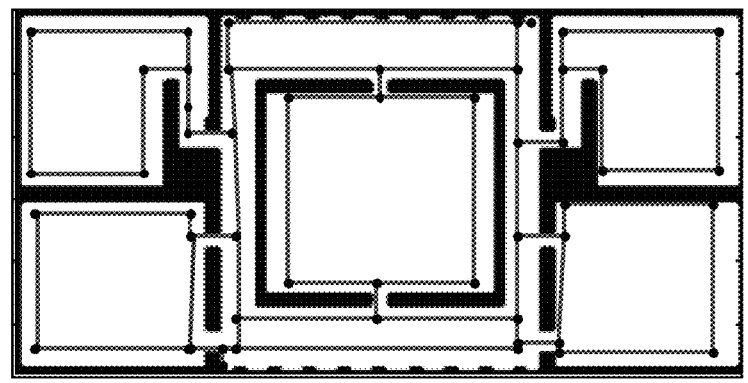
FIG. 4C depicts an example of an optimized network structure according to an embodiment of the present invention.

At step S106, the processing unit may detect corners in the skeleton of the potential movable area 112 as nodes and construct a graph by connecting the detected nodes with links as the network structure. At step S107, the processing unit may correct an invalid link that passes across at least partially immovable areas by shifting the nodes connected to the invalid links with minimal distance so that all the links do not pass across the immovable areas. FIG. 4B shows an example of a network structure initially obtained. The immovable areas may be represented as black regions in FIG. 4B.

At step S108, the processing unit may optionally find links corresponding to the inaccessible area 114 and annotate accessibility information to the found links. The processing of the step S108 may also be performed if the accessibility information annotation is requested.

At step S109, the processing unit may randomly select one of nodes that have room for improvement from among the nodes in the network structure. Any one of the nodes having a link that has a predetermined relationship to the predetermined directions may be selected for improvement.

In a particular embodiment, any one of the nodes having links that is nearly perpendicular or straight to each other but is not exactly perpendicular or straight to each other may be selected.

At step S110, the processing unit may determine whether a predetermined termination condition has been satisfied or not. The predetermined termination condition may include a convergence condition where there is no node that has room for improvement. Alternatively, or together with the convergence condition, the termination condition may include a stop condition that limits the maximum number of iterations for improvement.

If the processing unit determines that the predetermined termination condition has not been satisfied yet in step S110 (e.g., NO), the process may branch to step S111. At step S111, the processing unit may change a position of the selected node within a predetermined range around its initial position. At the processing of the step S111, the position of the selected node may be changed so that the link connected to the selected node orients toward any one of the predetermined directions. And then, the process may loop back to the step S109.

Figure 5A:
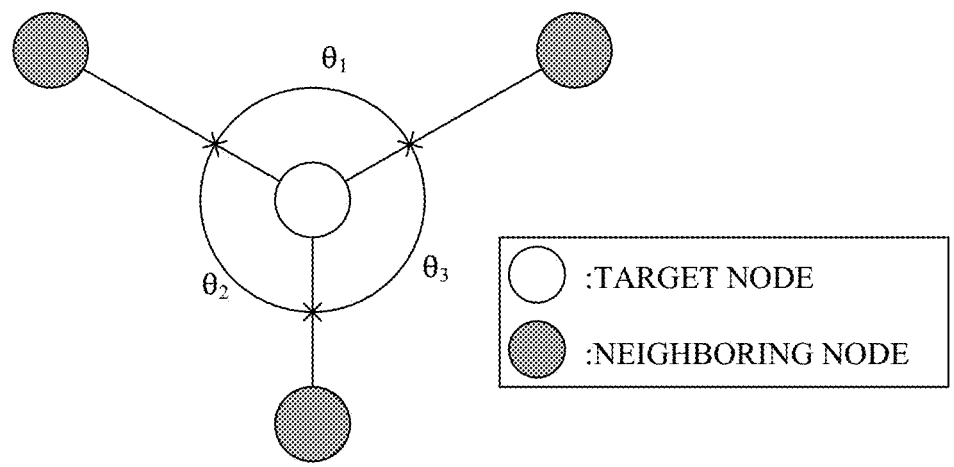
FIG. 5A illustrates an example of an evaluation function considering links connected to a target node according to an embodiment of the present invention.
Figure 5B:
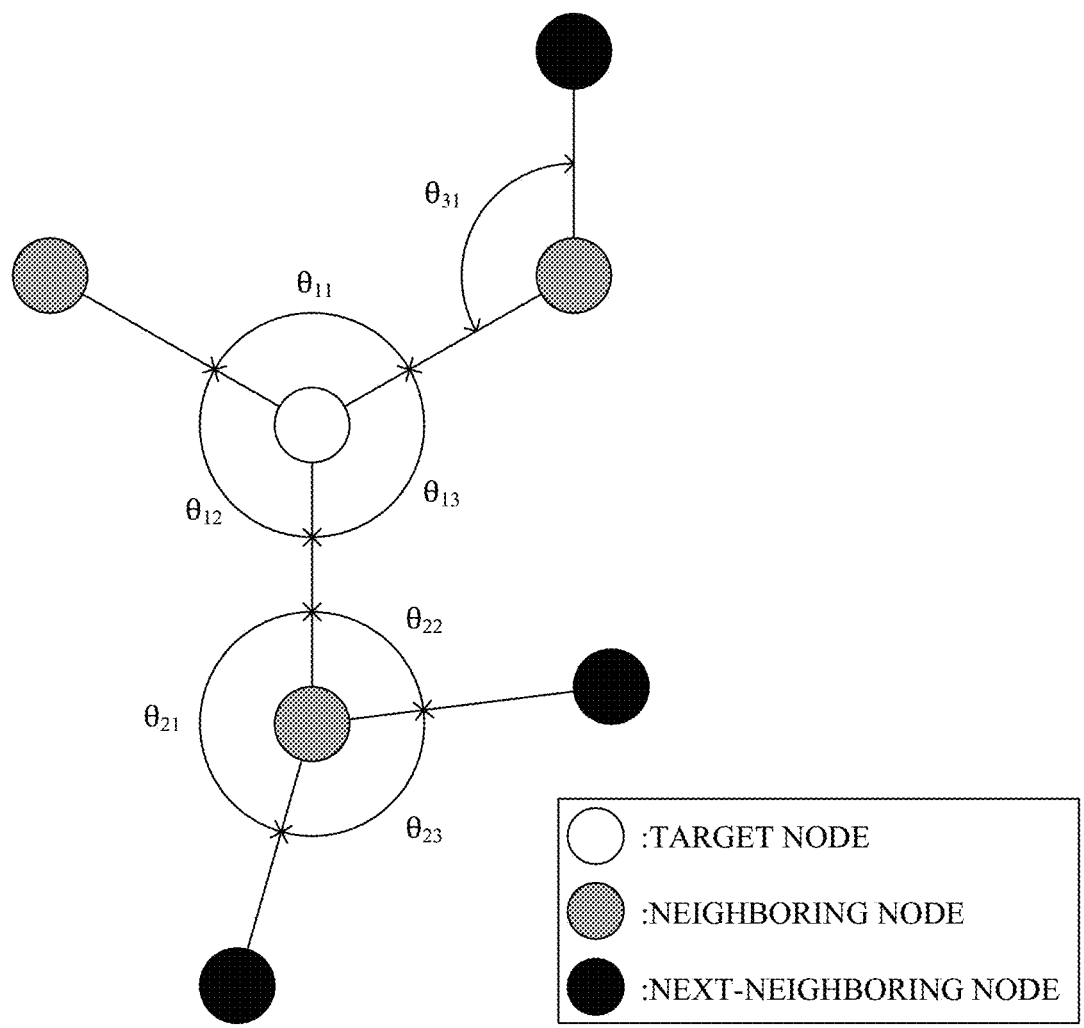
FIG. 5B illustrates an example of an evaluation function considering not only links connected to the target node, but also links connected to a neighboring node adjacent to the target node according to an embodiment of the present invention.

FIGS. 5A-5B describes examples of an evaluation function that can be used to select the node and to change the position of the node.

FIG. 5A shows an example of an evaluation function that considers links connected to merely a target node. In FIG. 5A, the target node is represented by a white circle and the neighboring node connected to the target node is represented by a gray circle. An example of the evaluation function that considers the links connected to merely the target node can be expressed as follow:

$$\sum_j \min(|90 - \theta_j|, |180 - \theta_j|),$$

where j represents a link connected to the target node and the $\theta_j$ represents an angle of the link j connected to the target node.

In an embodiment, at step S109, the processing unit may first determine whether or not the evaluation function is above a predetermined value for each node. Then, the processing unit may pick up the node as a candidate for improvement if the evaluation function for the node is determined to be above the predetermined value. Finally, the processing unit may randomly select any one from among the candidates if necessary. At step S111, the processing unit may change the position of the selected node to a next position so as to minimize the evaluation function and so as to minimize moving distance to the next position.

FIG. 5B shows an example of an evaluation function that considers not only links connected to the target node but also links connected to a neighboring node adjacent to the target node. In FIG. 5B, further a next-neighboring node connected to the neighboring node is represented by a black circle. An example of the evaluation function that considers links connected to the target node and the neighboring node can be expressed as follow:

$$\sum_{i,j} \min(|90 - \theta_{ij}|, |180 - \theta_{ij}|),$$

where i represents a node, j represents a link connected to the node i and the $\theta_{ij}$ represents an angle of the link j connected to the node i.

In an embodiment, at step S109, the processing unit may first determine whether or not the evaluation function is above a predetermined value for each node. Then, the processing unit may pick up the node as a candidate for improvement if the evaluation function for the node is determined to be above the predetermined value. Finally, the processing unit may randomly select any one from among the candidates if necessary. At step S111, the processing unit may change the position of the selected node to a next position so as to minimize the evaluation function and so as to minimize moving distance to the next position.

Referring back to FIG. 2, if the processing unit determines that the termination condition has already been satisfied in the step S110 (e.g., YES), the process may branch to step S112. At step S112, the processing unit may output the route network data including the network structure optimized through the steps of S109-S111 and the process ends at step S113.

Figure 6:
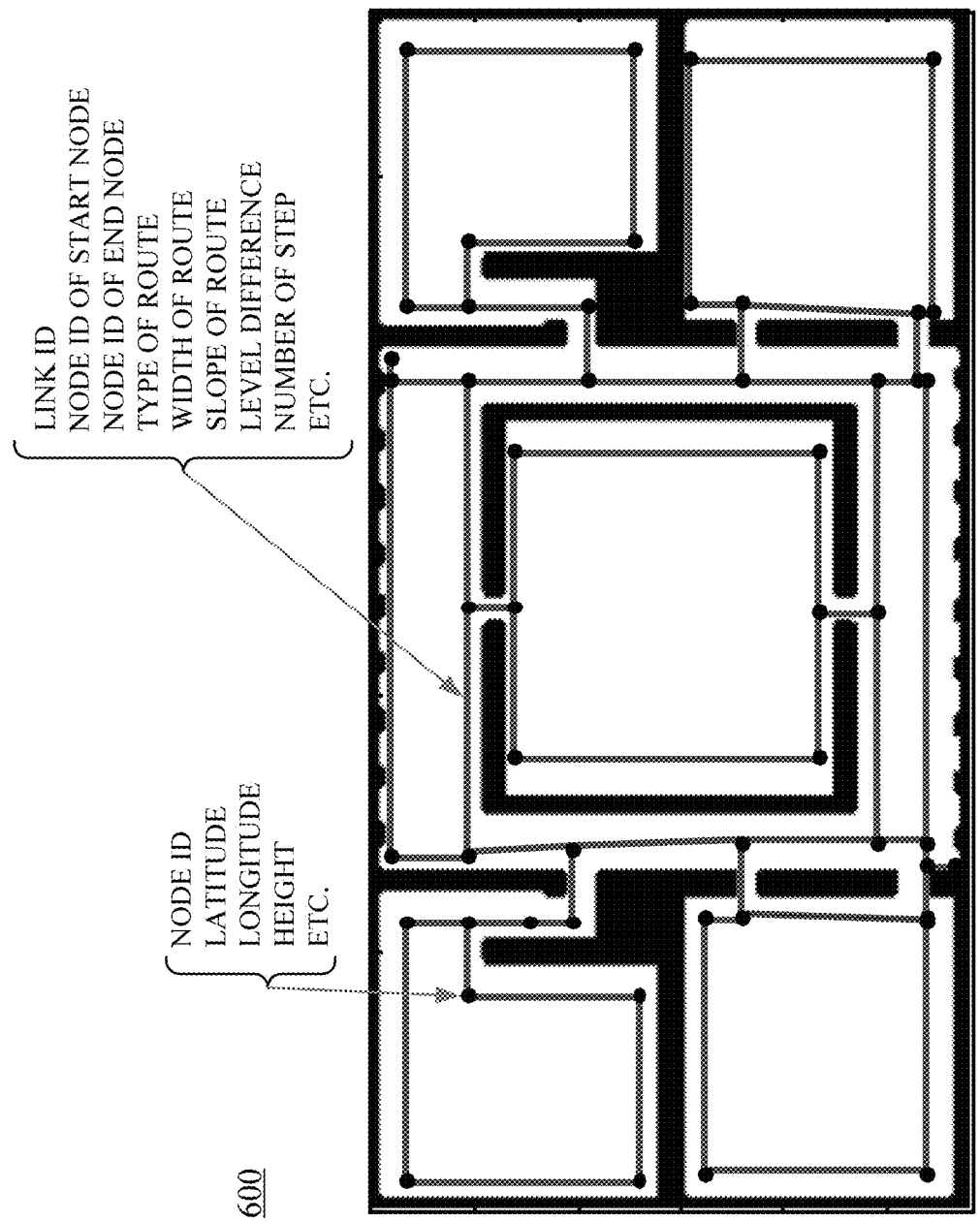
FIG. 6 illustrates a data structure of the route network data that was obtained from the image of the potential movable area shown in FIG. 3B by the process according to the exemplary embodiment of the present invention.

Referring now to FIG. 6, data structure 600 of the route network data is illustrated. In FIG. 6, a node is represented by a dot and a link is represented by a line. As shown in FIG. 6, the route network data may include a plurality of nodes each having node identifier, position information including latitude, longitude, height, etc. and a plurality of links each having a link identifier, node identifiers of start and end nodes, and accessibility information. The coordinates of the image can be mapped into global coordinates. The accessibility information shown in FIG. 6 includes a type of a route corresponding to the link, width of the route, slope of the route, a level difference in the route, the number of steps in the route. Also, the network structure may be further modified so that useless nodes such as a midpoint node in a straight flat path are removed.

As shown in FIG. 4B, the initial network structure presents a slightly irregular shape. In contrast, the optimized network structure shown in FIG. 4C has a linear and well-regulated shape, which would be appropriate for pedestrian accessible navigation.

According to an exemplary embodiment, the route network generation system 100 can generate route network data appropriate for the movement using available space information of a specific place. The positions of the nodes are updated by using the evaluation function that evaluates the deviation of the orientation of the link from predetermined directions. The positions of the nodes are constrained with respect to its initial position, which may initially locate along with walls in the target place. Thereby, simple, intuitive and safe navigation can be achieved.

According to some embodiments, the route network generation system 100 can annotate the information about accessibility feature to the route network data using the available space model of the target place. Also the route network generation system 100 can prepare a personalized route network optimized for a specific type of the movement, which may include walkers, manual/electric wheelchair users as well as person who are walking with buggy or walking with a trolley bag.

ALTERNATIVE EMBODIMENTS

In the aforementioned exemplary embodiment, the network structure is described to be optimized in a one-by-one manner, where one node is shifted for each iteration.

Now, referring to the series of FIGS. 1 and 7-9, a computer system and method for generating route network data for movement according to an alternative embodiment of the present invention is described, in which a plurality of nodes, more specifically all nodes in the network structure, are optimized simultaneously.

A block/flow diagram of a route network generation system 100 according to the alternative embodiment is almost same as that of the exemplary embodiments shown in FIG. 1. Since the configuration of the alternative embodiments have similarity to the exemplary embodiment, hereinafter, mainly features different from the exemplary embodiment will be described.

Similar to the exemplary embodiment, the network structure optimizer 140 according to an alternative embodiment may also optimize the network structure initially obtained by the network structure extractor 120. In an alternative embodiment, the network structure optimizer 140 may update the network structure to minimize an objective function that expresses features of the preferable shape of the network structure. In the describing embodiment, the objective function is a loss function in which case it is to be minimized. However, in another embodiment, the objective function may be a reward function in which case it is to be maximized.

The network structure that is appropriate for accessible navigation would have features including (a) minimal links, (b) corner or junctions in perpendicular or straight shape (or have simple angle such as 45 degrees, etc.), and (c) links that are along with a wall or landmark for locomotion cues, as described above.

To obtain a preferably-shaped network structure for accessible navigation, the objective function according to an alternative embodiment may include:

(1) a term that evaluates proximity to the initial position of the node;

(2) a term that evaluates deviation of orientation of the link from the predetermined directions; and (3) a term that evaluates deviation of position of the node from optimal distance to a wall in the place.

The network structure optimizer 140 may optimize the network structure by minimizing the objective function to obtain a shape that approximates the aforementioned preferably-shaped network structure.

Figure 7:
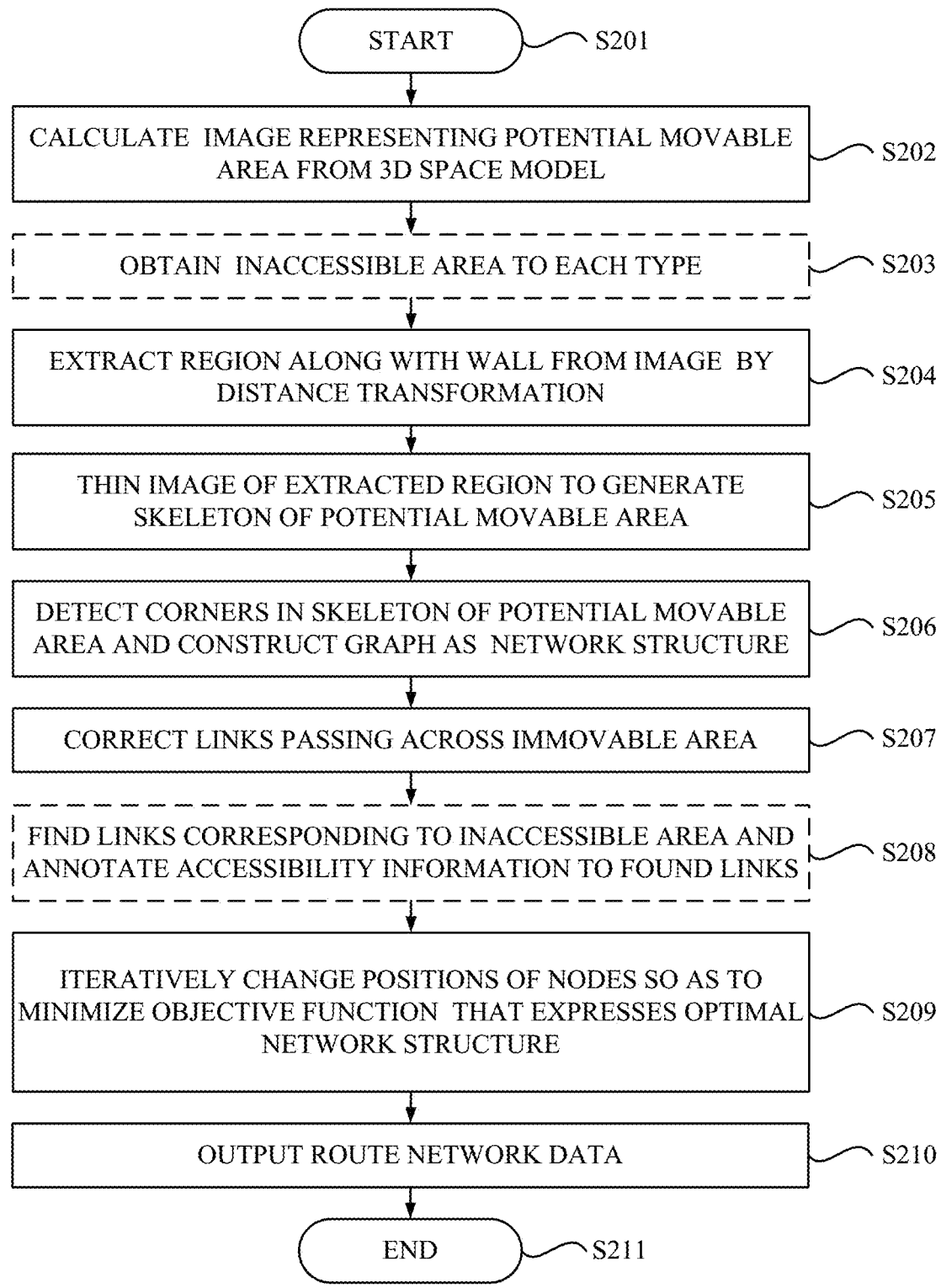
FIG. 7 is a flowchart depicting a process for generating route network data for movement in the route network generation system according to an alternative embodiment of the present invention.

FIG. 7 shows a flowchart depicting a method/process for generating route network data in the route network generation system 100 according to an alternative embodiment. Note that the process shown in FIG. 7 may also be performed by a processing unit that implements the modules 110, 120, 130 and 140 shown in FIG. 1.

The process shown in FIG. 7 may begin at step S201 in response to receiving a request for generating route network data. The processing of steps from S202 to S208 may be same as the processing of the steps from S102 to S108 shown in FIG. 2.

Figure 8A:
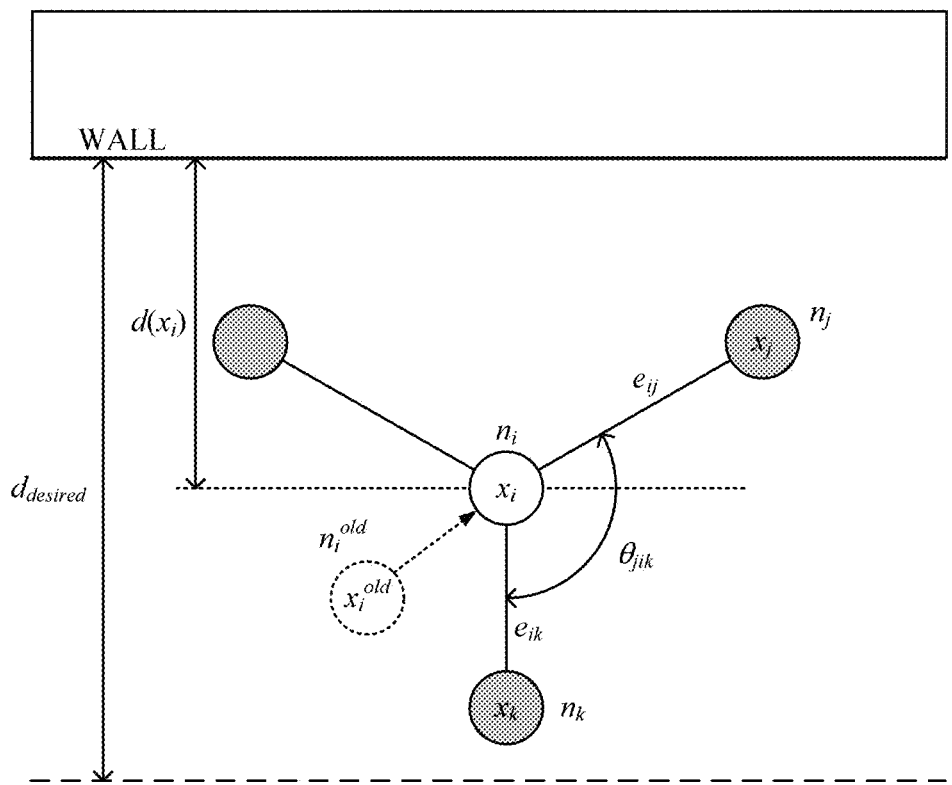
FIG. 8A is a schematic diagram of an objective function according to an alternative embodiment of the present invention.

At step S209, the processing unit may iteratively change positions of the plurality of the nodes in the network structure so as to minimize an objective function that expresses a optima network structure. FIG. 8A describes an objective function according to an alternative embodiment of the present invention. The optimization of the network structure can be formulated as an optimization problem using the objective function $J(X)$ expressed as following equation:

$$\text{minimize } J(X) = R(X) + P(X) + D(X)$$
$$= \frac{1}{2}\sum_{i=1}^{n}(x_i - x_i^{init})^2 + \lambda \sum_{i=1}^{n}\sum_{j,k \in N_i}$$
$$p(\theta_{jik}(x_i, x_j, x_k)) + \rho \sum_{i=1}^{n}(d(x_i) - d_{opt})^2,$$

Subject to $d(x_i) \geq d_{min}$.

where i represents a node, $N_i$ represents a set of neighboring nodes adjacent to the node $n_i$, $x_i$ represents a current position of the node $n_i$, $x_i^{init}$ represents the initial position of the node $n_i$, $\theta_{jik}$ represents an angle between link $e_{ij}$ and $e_{ik}$, a function $d(x_i)$ expresses a distance from a wall to the current position of the node $n_i$, $d_{opt}$ denotes optimal distance from the wall, $d_{min}$ denotes minimum distance from the wall to the nodes, and $\rho$ and $\lambda$ denotes coefficients.

In the aforementioned equation, the first term $R(X)$ may evaluate proximity to the initial position of the node. The second term $P(X)$ may evaluate deviation of orientation of the link from the predetermined directions. The third term $D(X)$ may evaluate deviation of position of the node from optimal distance to a wall in the place. The $d(x_i)$ can be obtained from the potential movable area 112 by a distance transformation.

Figure 8B:
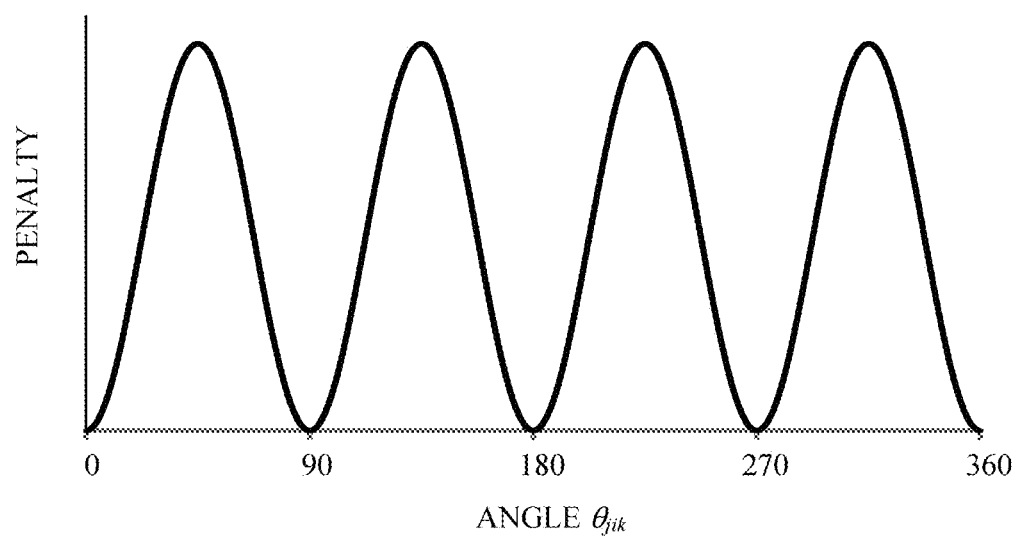
FIG. 8B depicts a function form of an angle penalty term used in an objective function according to an alternative embodiment of the present invention.

The second term $P(X)$ may have a function form that minimizes at predetermined directions (e.g., 0, 90, 180, 270 degrees). FIG. 8B depicts an example of a function form of the second angle penalty term used in the objective function. Such function form can be expressed as follows:

$$p(\theta_{jik}) = \sin^2(2\theta_{jik}) \text{ or } (|\sin(2\theta e_{jik})|).$$

In this example, since the second angle penalty term gives a minimum value at every predetermined directions, all of the predetermined directions are treated equally. However, in other embodiments, the predetermined directions can be prioritized so that the term gives a minimum value at some predetermined directions (e.g., 0, 90, 180, 270 degrees) and a second minimum value at remaining predetermined directions (e.g., 30 (1 o'clock), 45, 60 (2 o'clock), 120 (4 o'clock), 150 (5 o'clock), 210 (7 o'clock), 240 (8 o'clock), 300 (10 o'clock) or 330 (11 o'clock) degrees).

The optimization problem formulated by the aforementioned equation can be solved by using any one of known optimization solvers.

Referring back to FIG. 7, if the processing unit determines that a predetermined termination condition has already been satisfied during the step S209, the process may proceeds to step S210. At step S210, the processing unit may output the route network data including the network structure optimized at step S209 and the process ends at step S211.

Figure 9:
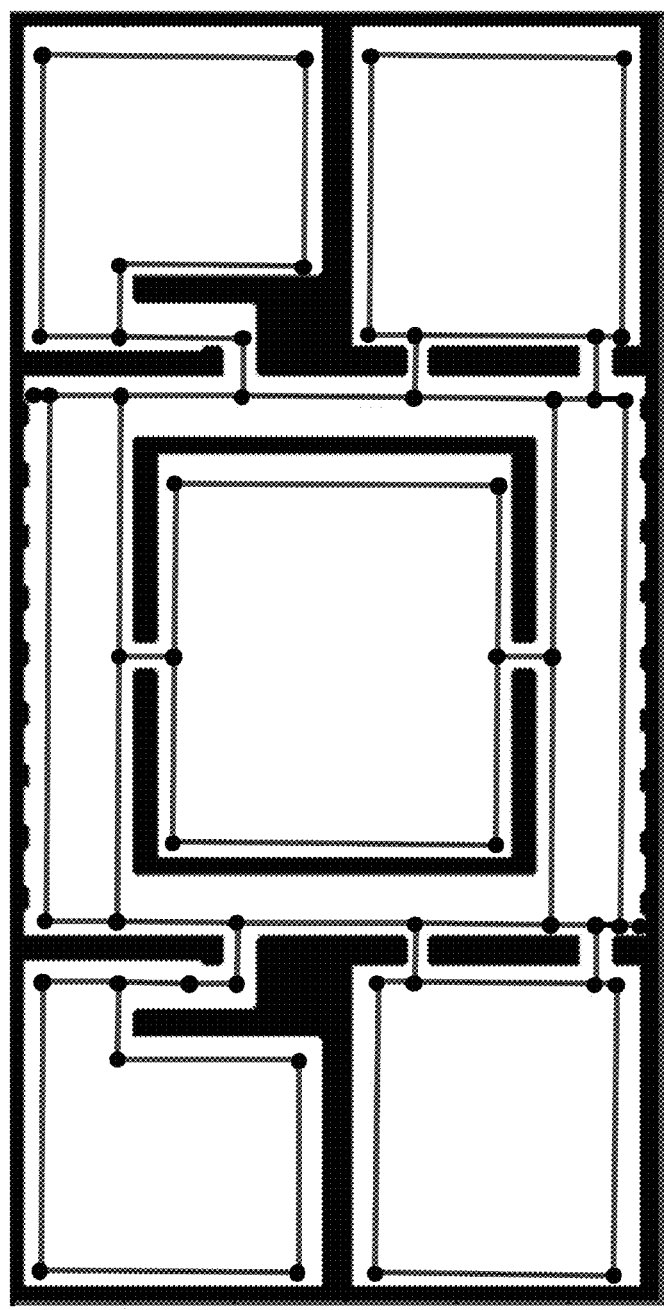
FIG. 9 illustrates a data structure of route network data that was obtained from the image of the potential movable area shown in FIG. 3B by the process according to an alternative embodiment of the present invention.

Referring to FIG. 9, a data structure 900 of the route network data that was obtained by the process according to an embodiment of the present invention is illustratively depicted. As shown in FIG. 9, similar to the exemplary embodiment, the route network data may include a plurality of nodes each having node identifier, position information and a plurality of links each having accessibility information.

By comparing the data structure 900 with the optimized network structure 600 shown in FIG. 6, the optimized network structure 900 shown in FIG. 9 presents a more linear and well-regulated shape, which can be more appropriate for pedestrian accessible navigation.

According to an alternative embodiment, the route network generation system 100 can generate route network data appropriate for the movement using available space information of a specific place. The positions of the nodes are updated so as to minimize the objective function that evaluates deviation of orientation of the link from the predetermined directions; and deviation of position of the node from predetermined distance to a wall or landmark in the place. The condition relating to an initial position of the node may also be incorporated in the objective function as the first term evaluating proximity to the initial position of the node.

Computer Hardware Component

Figure 10:
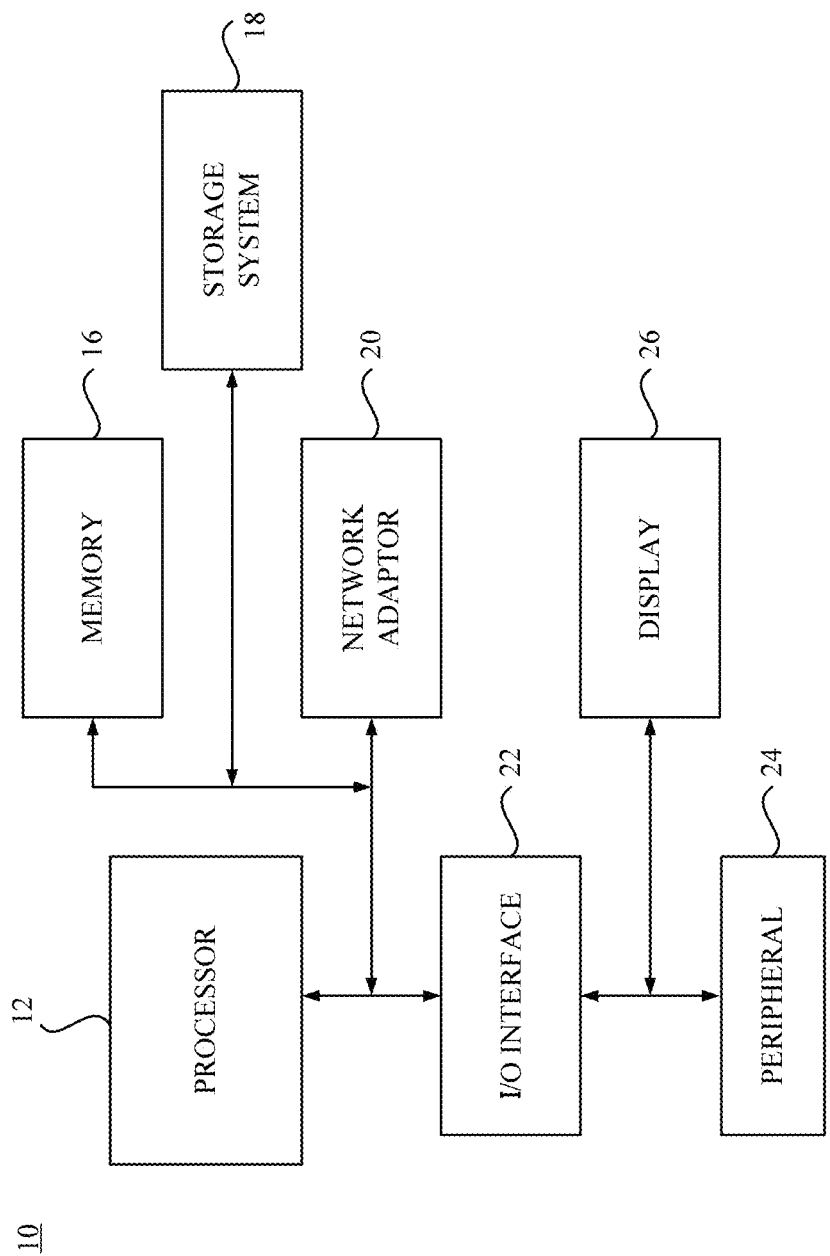
FIG. 10 depicts a computer system according to an embodiment of the present invention.

Referring now to FIG. 10, a schematic of an example of a computer system 10, which can be used for the route network generation system 100, is shown. The computer system 10 shown in FIG. 10 is implemented as computer system. The computer system 10 is only one example of a suitable processing device and is not intended to suggest any limitation as to the scope of use or functionality of embodiments of the invention described herein. Regardless, the computer system 10 is capable of being implemented and/or performing any of the functionality set forth hereinabove.

The computer system 10 is operational with numerous other general purpose or special purpose computing system environments or configurations. Examples of well-known computing systems, environments, and/or configurations that may be suitable for use with the computer system 10 include, but are not limited to, personal computer systems, server computer systems, thin clients, thick clients, handheld or laptop devices, in-vehicle devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 10 may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 10, the computer system 10 is shown in the form of a general-purpose computing device. The components of the computer system 10 may include, but are not limited to, a processor (or processing unit) 12 and a memory 16 coupled to the processor 12 by a bus including a memory bus or memory controller, and a processor or local bus using any of a variety of bus architectures.

The computer system 10 typically includes a variety of computer system readable media. Such media may be any available media that is accessible by the computer system 10, and it includes both volatile and non-volatile media, removable and non-removable media.

The memory 16 can include computer system readable media in the form of volatile memory, such as random access memory (RAM). The computer system 10 may further include other removable/non-removable, volatile/non-volatile computer system storage media. By way of example only, the storage system 18 can be provided for reading from and writing to a non-removable, non-volatile magnetic media. As will be further depicted and described below, the storage system 18 may include at least one program product having a set (e.g., at least one) of program modules that are configured to carry out the functions of embodiments of the invention.

Program/utility, having a set (at least one) of program modules, may be stored in the storage system 18 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

The computer system 10 may also communicate with one or more peripherals 24, such as a keyboard, a pointing device, a car navigation system, an audio system, etc.; a display 26; one or more devices that enable a user to interact with the computer system 10; and/or any devices (e.g., network card, modem, etc.) that enable the computer system 10 to communicate with one or more other computing devices. Such communication can occur via Input/Output (I/O) interfaces 22. Still yet, the computer system 10 can communicate with one or more networks such as a local area network (LAN), a general wide area network (WAN), and/or a public network (e.g., the Internet) via the network adapter 20. As depicted, the network adapter 20 communicates with the other components of the computer system 10 via a bus. It should be understood that although not shown, other hardware and/or software components could be used in conjunction with the computer system 10. Examples, include, but are not limited to: microcode, device drivers, redundant processing units, external disk drive arrays, RAID systems, tape drives, and data archival storage systems, etc.

Computer Program Implementation

The present invention may be a computer system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for generating route network data for movement, the method comprising:
   building a network structure for route network data of a place using a calculated movable area of the place for a target type of movement indicating a three-dimensional region within which a target object is free to move, the network structure including a plurality of nodes and a plurality of links representing routes within the place; and
   updating the network structure to facilitate navigation by selecting a node connected to a link having a predetermined relationship with the node to a predetermined direction, and shifting a position of the node within a predetermined range around an initial position of the node to orient the link connected to the node toward any one of the predetermined directions.

2. The method of claim 1, wherein the target type includes a plurality of types of movement, the movable area for the target type being a union area movable for at least one of the plurality of the types, and the method further comprises:

obtaining an inaccessible area to a first type by subtracting a first movable area for the first type from the union area or a second movable area for a second type other than the first type;

finding a found link corresponding to the inaccessible area from the network structure; and annotating accessibility information to the found link in the network structure by referring a location corresponding to the found link in the space model of the place.

3. The method of claim 2, wherein the target type includes two or more types of movement as the first type, the obtaining being performed for each of the two or more types, the finding being performed by using each inaccessible area to each of the two or more types or by using a union area of the inaccessible areas for the two or more types.

4. The method of claim 2, wherein the accessibility information includes at least one information selected from the group consisting of a type of a route corresponding to the link, width of the route, slope of the route, a level difference in the route, a number of steps in the route, existence of a textured paving in the route, existence of a handrail in the route and a surface type of the route.

5. The method of claim 2, wherein the plurality of types of movement includes at least two movements selected from the group consisting of walking without any device, walking with a stick, walking with two sticks or crutches, walking with a frame, walking with a white cane, walking with an assistance dog, walking with a guide, moving by a manual wheelchair, moving by an electric wheelchair, walking with small children, walking with a trolley bag, and walking with a buggy.

6. The method of claim 1, wherein updating further includes:

determining whether or not an evaluation function relating to an angle between links connected to the node is above or below a predetermined value, the node being selected if the evaluation function for the node is determined to be above or below the predetermined value, the position of the node being changed to a next position to minimize or maximize the evaluation function and to minimize moving distance to the next position.

7. The method of claim 1, wherein updating further includes:

determining whether or not an evaluation function relating to an angle between links connected to the node and an angle between links connected to a neighbor node connected to the node is above or below a predetermined value, the node being selected if the evaluation function for the node is determined to be above or below the predetermined value, the position of the node being changed to a next position to minimize or maximize the evaluation function and to minimize moving distance to the next position.

8. The method of claim 1, wherein updating includes:

changing positions of the plurality of the nodes in the network structure to minimize or maximize an objective function, the objective function including:

a term evaluating proximity to the initial position of the node;

a term evaluating deviation of orientation of the link from the predetermined directions; and a term evaluating deviation of position of the node from optimal distance to a wall and/or a landmark in the place.

9. The method of claim 1, wherein the predetermined directions include at least one direction selected from the group consisting of a direction straight to a second link connected to the node, a direction perpendicular to the second link, a direction having an angle of 45 degrees to the second link, and directions each having an angle corresponding to 1, 2, 4, 5, 7, 8, 10 or 11 o'clock with respect to the second link.

10. The method of claim 1, wherein calculating includes:

simulating movement of the object model for the target type in the space model of the place under a constraint on a size, a ground contact area, stair-mounting ability and/or slope-climbing ability relating to the target type.

11. The method of claim 1, wherein building includes:

extracting a skeleton of the movable area from the movable area;

detecting corners in the skeleton of the movable area as detected nodes; and constructing a graph by connecting the detected nodes with a respective link as the network structure.

12. The method of claim 11, wherein extracting includes:

extracting a region along a wall and/or a landmark in the place from an image of the movable area; and thinning the region to generate the skeleton of the movable area.

13. The method of claim 1, wherein the space model and the object model include 3D modeling data, and the route network data includes pedestrian space network data including the plurality of nodes each having position information and the plurality of links each having accessibility information.

14. A computer system for generating route network data for movement, by executing program instructions, the computer system comprising:

a memory tangibly storing the program instructions; and a processor in communications with the memory, wherein the processor is configured to:

build a network structure for route network data of a place using a calculated movable area of the place for the target type of movement indicating a three-dimensional region within which a target object is free to move, the network structure including a plurality of nodes and a plurality of links representing routes within the place; and update the network structure to facilitate navigation by selecting a node connected to a link having a predetermined relationship with the node to a predetermined direction, and shifting a position of the node within a predetermined range around an initial position of the node to orient the link connected to the node toward any one of the predetermined directions.

15. The computer system of claim 14, wherein the target type includes a plurality of types of movement, the movable area for the target type being a union area movable for at least one of the plurality of the types, and the processor is further configured to:

obtain an inaccessible area to a first type by subtracting a first movable area for the first type from the union area or a second movable area for a second type other than the first type;

find a found link corresponding to the inaccessible area from the network structure; and annotate accessibility information to the found link in the network structure by referring a location corresponding to the found link in the space model of the place.

16. The computer system of claim 14, wherein the processor is further configured to change positions of the plurality of the nodes in the network structure to minimize or maximize an objective function, the objective function including:
- a term evaluating proximity to the initial position of the node;
- a term evaluating deviation of orientation of the link from the predetermined directions; and
- a term evaluating deviation of position of the node from optimal distance to a wall and/or a landmark in the place.

17. A computer program product for generating route network data for movement, the computer program product comprising a non-transitory computer readable storage medium having program instructions embodied therewith, the program instructions executable by a computer to cause the computer to perform a method comprising:
- building a network structure for route network data of a place using a calculated movable area of the place for the target type of movement indicating a three-dimensional region within which a target object is free to move, the network structure including a plurality of nodes and a plurality of links representing routes within the place; and
- updating the network structure to facilitate navigation by selecting a node connected to a link having a predetermined relationship with the node to a predetermined direction, and shifting a position of the node within a predetermined range around an initial position of the node to orient the link connected to the node toward any one of the predetermined directions.

18. The computer program product of claim 17, wherein the target type includes a plurality of types of movement, the movable area for the target type being a union area movable for at least one of the plurality of the types and the method further comprises:
- obtaining an inaccessible area to a first type by subtracting a first movable area for the first type from the union area or a second movable area for a second type other than the first type;
- finding a found link corresponding to the inaccessible area from the network structure; and
- annotating accessibility information to the found link in the network structure by referring a location corresponding to the found link in the space model of the place.

* * * * *